US012601675B2

(12) United States Patent
Okabe et al.

(10) Patent No.: US 12,601,675 B2
(45) Date of Patent: Apr. 14, 2026

(54) MAGNETIC PIPE SENSOR

(71) Applicant: Yokogawa Electric Corporation, Tokyo (JP)

(72) Inventors: Nobuo Okabe, Tokyo (JP); Panayiotis Kiliaris, Nicosia (CY); Philip Blakeley, Cambridgeshire (GB); Chetan Laddha, Surrey (GB)

(73) Assignee: Yokogawa Electric Corporation, Tokyo (JP)

( * ) Notice: Subject to any disclaimer, the term of this patent is extended or adjusted under 35 U.S.C. 154(b) by 286 days.

(21) Appl. No.: 18/455,610

(22) Filed: Aug. 24, 2023

(65) Prior Publication Data

US 2024/0068932 A1 Feb. 29, 2024

(30) Foreign Application Priority Data

Aug. 30, 2022 (JP) ................................. 2022-137371

(51) Int. Cl.
*G01N 17/04* (2006.01)
(52) U.S. Cl.
CPC .................................... *G01N 17/04* (2013.01)
(58) Field of Classification Search
CPC ...... G01N 17/04; G01N 17/006; G01N 27/82; G01D 5/12; G01D 11/245
See application file for complete search history.

(56) References Cited

U.S. PATENT DOCUMENTS

| | | | | |
|---|---|---|---|---|
| 4,110,689 A | * | 8/1978 | Schonstedt | G01R 33/04 324/345 |
| 4,439,731 A | * | 3/1984 | Harrison | B65G 43/02 324/243 |
| 4,982,158 A | * | 1/1991 | Nakata | G01R 33/10 505/162 |
| 5,047,719 A | * | 9/1991 | Johnson | G01N 27/9006 336/20 |
| 5,140,264 A | * | 8/1992 | Metala | G01N 27/904 324/227 |
| 5,262,722 A | * | 11/1993 | Hedengren | G01N 27/902 336/200 |
| 5,371,461 A | * | 12/1994 | Hedengren | G01N 27/9053 324/225 |

(Continued)

FOREIGN PATENT DOCUMENTS

| | | |
|---|---|---|
| CN | 103983688 A | 8/2014 |
| CN | 112782270 A | 5/2021 |

OTHER PUBLICATIONS

Extended European Search Report for counterpart European Application No. 23193748.3, issued by the European Patent Office on Jan. 2, 2024.

*Primary Examiner* — David J Bolduc

(57) ABSTRACT

An apparatus including one or more sensor units. Each of the sensor units includes an inner shell, an outer shell, and a magnetic sensor array. The magnetic sensor array is disposed between the inner shell and the outer shell. The inner shell, the outer shell, and the magnetic sensor array have curved shapes that complements an outer surface of a pipe. The magnetic sensor array may comprise a plurality of printed circuit board strips. Each of the plurality of printed circuit board strips comprise a plurality of magnetic sensors distributed along each of the plurality of the printed circuit board strips.

19 Claims, 12 Drawing Sheets

(56) References Cited

U.S. PATENT DOCUMENTS

Figure 1:
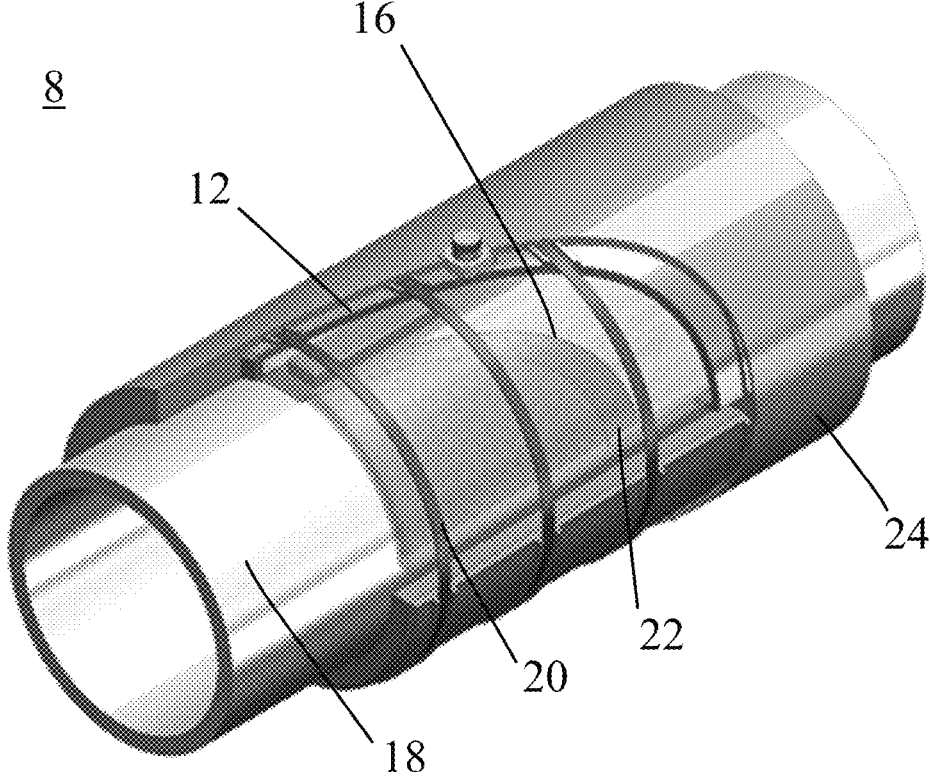

| | | | | |
|---|---|---|---|---|
| 5,389,876 A * | 2/1995 | Hedengren | G01N 27/902 | 324/262 |
| 5,565,633 A * | 10/1996 | Wernicke | G01N 27/82 | 73/865.8 |
| 5,659,248 A * | 8/1997 | Hedengren | G01N 27/9013 | 336/200 |
| 11,402,924 B2 * | 8/2022 | Senft | G01B 7/003 | |
| 2006/0217908 A1 * | 9/2006 | Wang | G01N 27/9046 | 702/64 |
| 2009/0000386 A1 * | 1/2009 | Paradis | G01D 3/028 | 244/129.1 |
| 2009/0223833 A1 * | 9/2009 | Forsyth | G01N 17/04 | 204/400 |
| 2010/0052704 A1 * | 3/2010 | Fay | G01N 17/04 | 324/693 |
| 2010/0127699 A1 * | 5/2010 | Wang | G01N 27/9013 | 324/238 |
| 2010/0182023 A1 * | 7/2010 | Pena | G01N 27/24 | 324/700 |
| 2015/0300155 A1 * | 10/2015 | Campbell | E21B 47/07 | 73/431 |
| 2015/0300841 A1 * | 10/2015 | Campbell | E21B 47/08 | 310/68 B |
| 2015/0300848 A1 * | 10/2015 | Campbell | G01D 5/2013 | 29/592.1 |
| 2016/0025682 A1 * | 1/2016 | Walker | G01N 27/9006 | 324/222 |
| 2016/0245674 A1 * | 8/2016 | Ausserlechner | G01D 11/24 | |
| 2017/0227504 A1 * | 8/2017 | Boudreau | G01N 29/225 | |
| 2018/0023980 A1 * | 1/2018 | Schoepe | G01D 5/2451 | 324/207.25 |
| 2019/0257675 A1 * | 8/2019 | Lewis | G01D 7/00 | |
| 2019/0317048 A1 * | 10/2019 | Ferdous | G01N 15/0806 | |
| 2020/0057027 A1 | 2/2020 | Bartlett | | |
| 2020/0242900 A1 * | 7/2020 | Vaganay | G01M 3/3236 | |

* cited by examiner

44

44

MAGNETIC PIPE SENSOR

The contents of the following patent application(s) are incorporated herein by reference:

NO. 2022-137371 filed in JP on Aug. 30, 2022

BACKGROUND

Monitoring subsea equipment is an important task for oil and gas companies, as the consequences of equipment failure can be disastrous. One such example is the monitoring of corrosion in subsea pipelines. Subsea pipelines lie on the sea bed or are buried inside the sea bed in a trench, transporting substances such as oil, gas, or water.

Pipelines vary in size and material depending on what application they are used for. Pipeline diameters can vary from 50 mm to 2 m and can vary in wall thickness from 10 mm to 75 mm. The pipes must be made from a strong and durable material as they may be on the sea bed for up to 20 years whilst constantly serving their purpose. This being the case, the pipelines are usually made from high yield strength steel which are terrific by nature, and therefore can be magnetized.

One threat to the pipeline's longevity is corrosion, and in particular internal corrosion. If corrosion takes place on the exterior of the pipe, it can be easily inspected, however internal corrosion is much more difficult to monitor. Specifically, localized corrosion is a unique threat because it corrodes faster than general corrosion and has uneven growth characteristics which make it difficult to predict.

SUMMARY

Embodiments relate to an apparatus including one or more sensor units. Each of the sensor units includes an inner shell, an outer shell, and a magnetic sensor array. The magnetic sensor array is disposed between the inner shell and the outer shell. The inner shell, the outer shell, and the magnetic sensor array have curved shapes that complements an outer surface of a pipe. The sensor units are configured to detect corrosion of the pipe over time. The sensor units are arranged contiguously around the pipe such that the sensor units surround the pipe. The plurality of sensor units are arranged contiguously around the pipe such that there are minimal blind zones between the magnetic sensor arrays of the sensor units. The inner shell and/or the outer shell includes either aluminum, carbon fiber, industrial grade plastic, and/or a hybrid material. The magnetic sensor arrays include a plurality of printed circuit board strips which are arranged in parallel.

DRAWINGS

Example FIG. 1 illustrates a magnetic pipe sensor, in accordance with embodiments.

Figure 2:
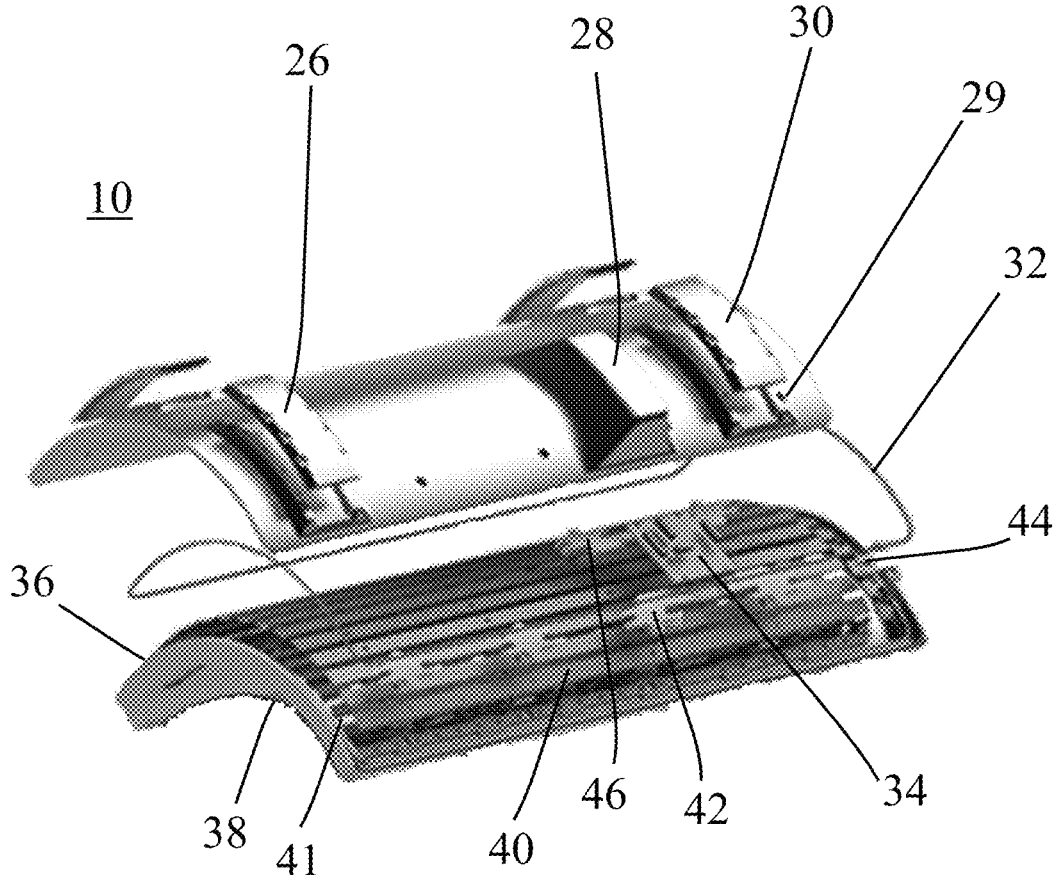

Example FIG. 2 illustrates components of a magnetic pipe sensor, in accordance with embodiments.

Figure 3A:
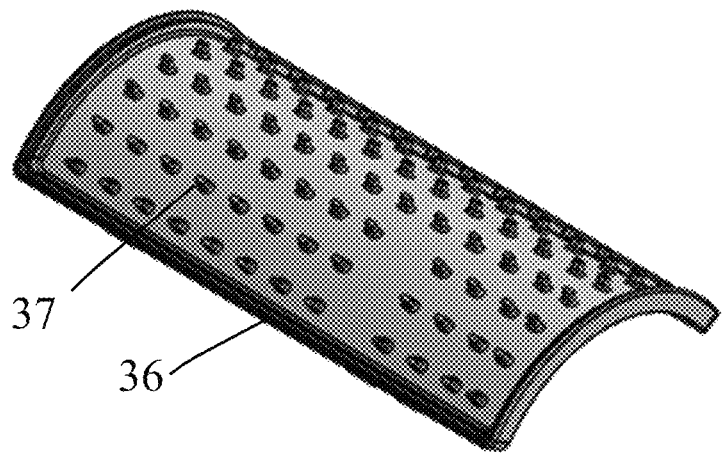
Figure 3B:
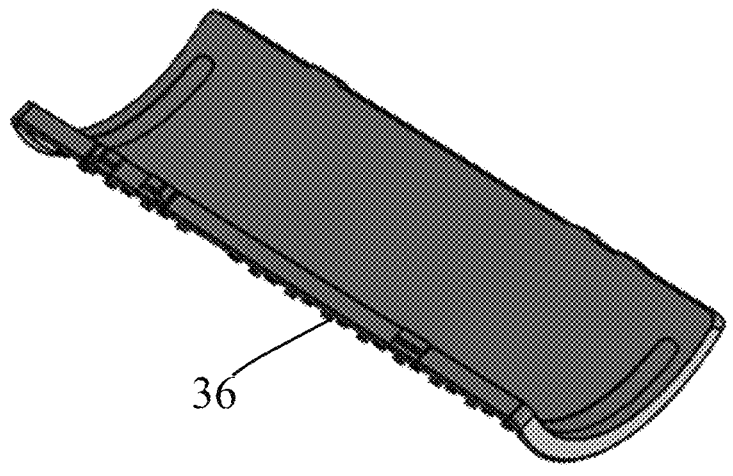

Example FIGS. 3A and 3B illustrate inner shells of a magnetic pipe sensor, in accordance with embodiments.

Figure 4A:
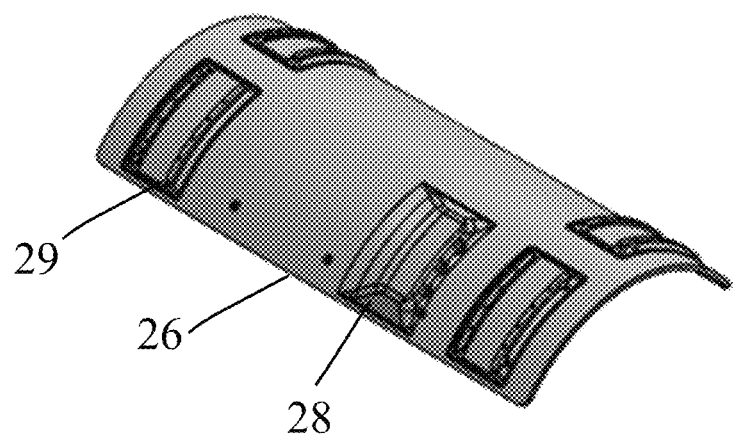
Figure 4B:
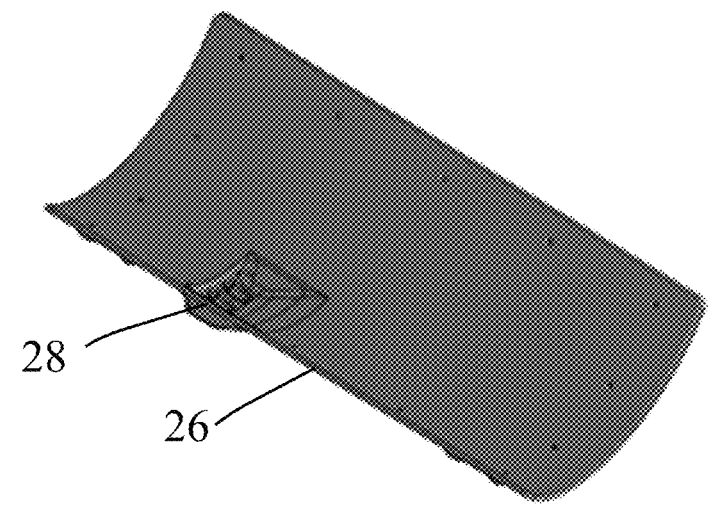

Example FIGS. 4A and 4B illustrate outer shells of a magnetic pipe sensor, in accordance with embodiments.

Figure 5A:
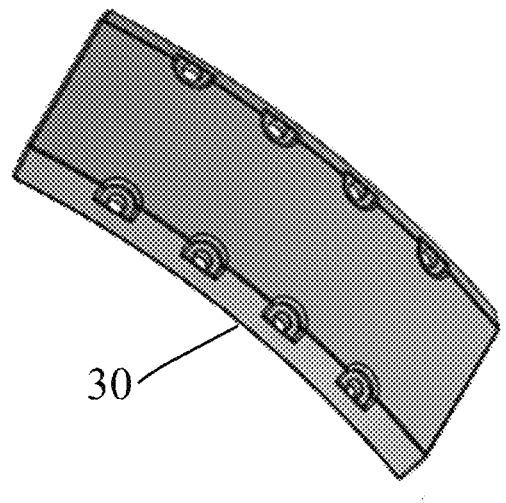
Figure 5B:
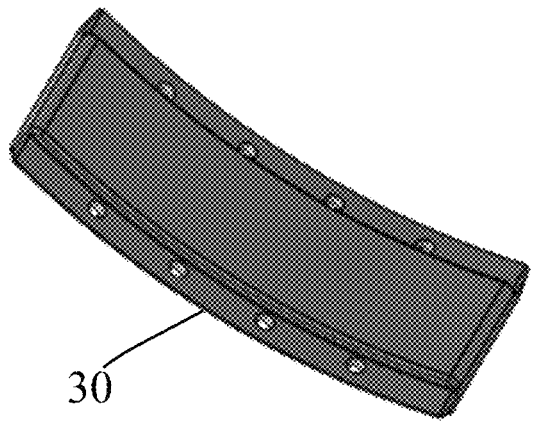

Example FIGS. 5A and 5B illustrate belt covers of a magnetic pipe sensor, in accordance with embodiments.

Figure 6A:
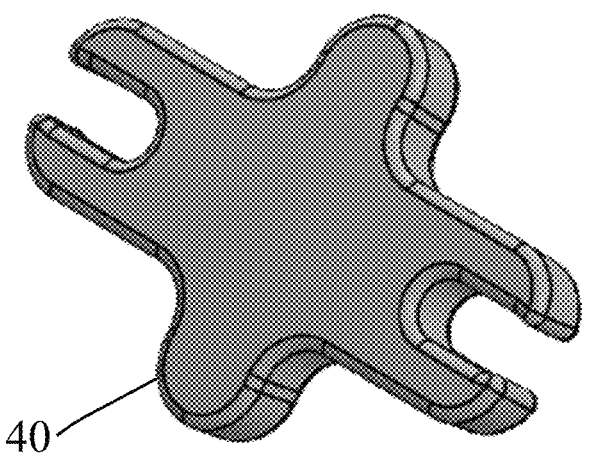
Figure 6B:
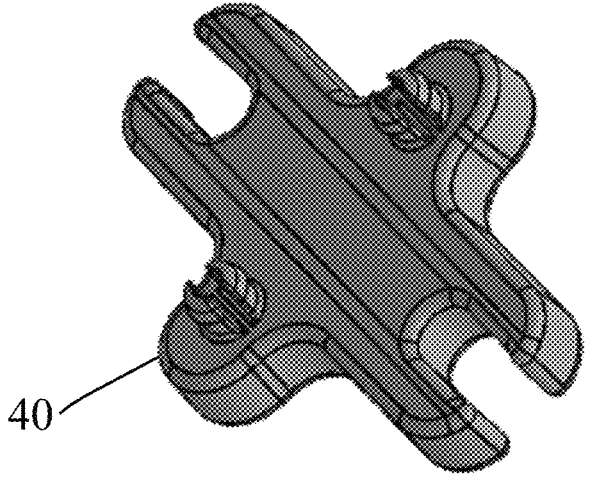

Example FIGS. 6A and 6B illustrate strips printed circuit board holders of a magnetic pipe sensor, in accordance with embodiments.

Figure 7A:
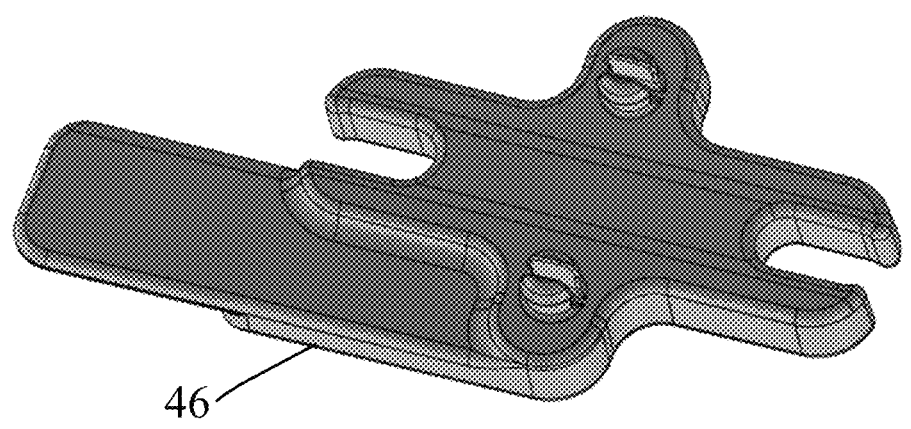
Figure 7B:
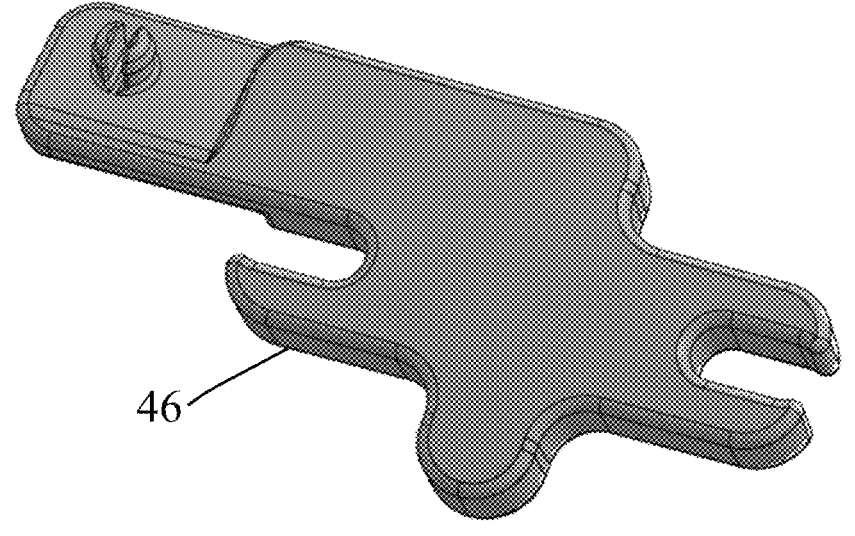

Example FIGS. 7A and 7B illustrate signal processing unit compatible printed circuit board holders of a magnetic pipe sensor, in accordance with embodiments.

Figure 8A:
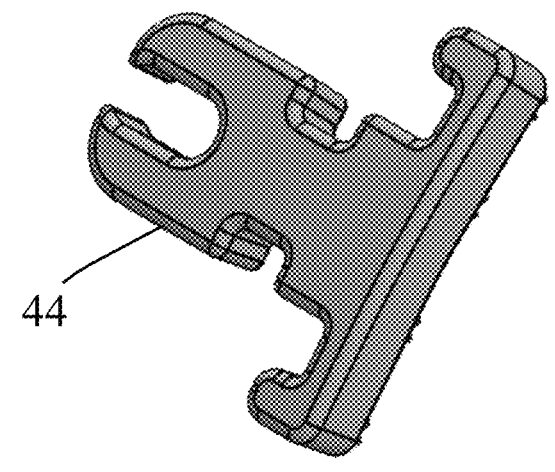
Figure 8B:
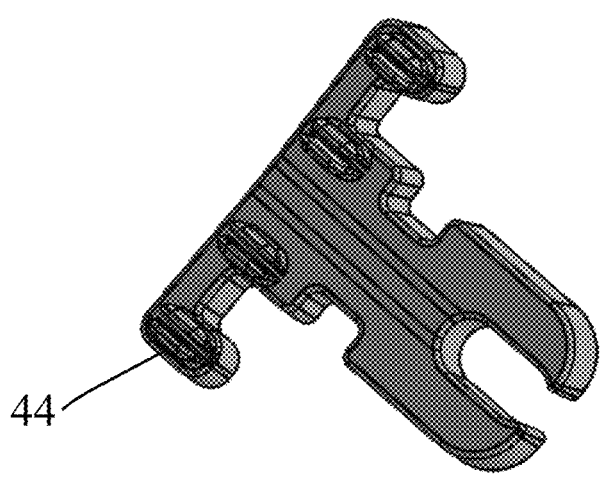

Example FIGS. 8A and 8B illustrate flex printed circuit board holders of a magnetic pipe sensor, in accordance with embodiments.

Figure 9:
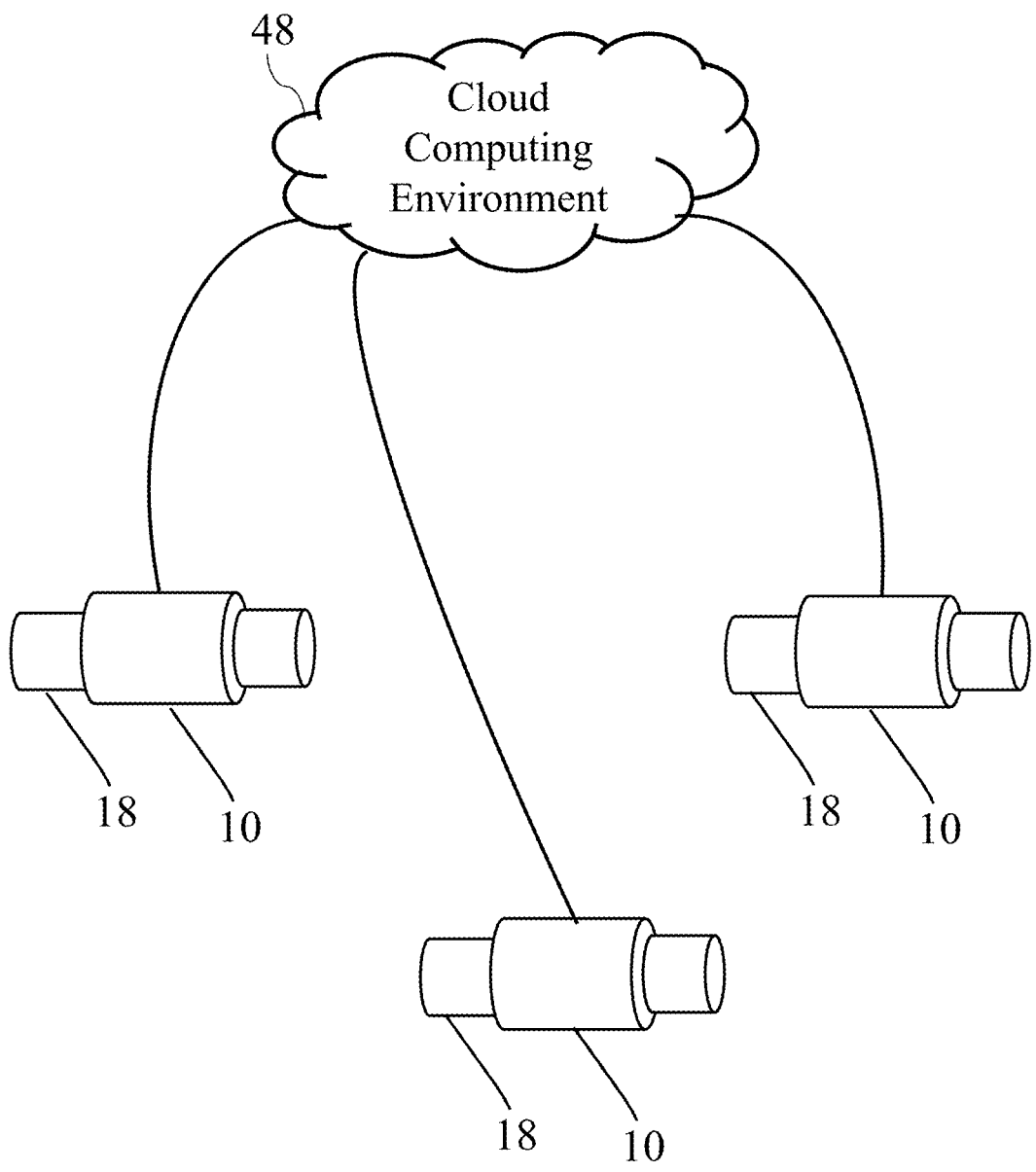

Example FIG. 9 illustrates a cloud and/or network based system in communication with magnetic pipe sensors, in accordance with embodiments.

Figure 10:
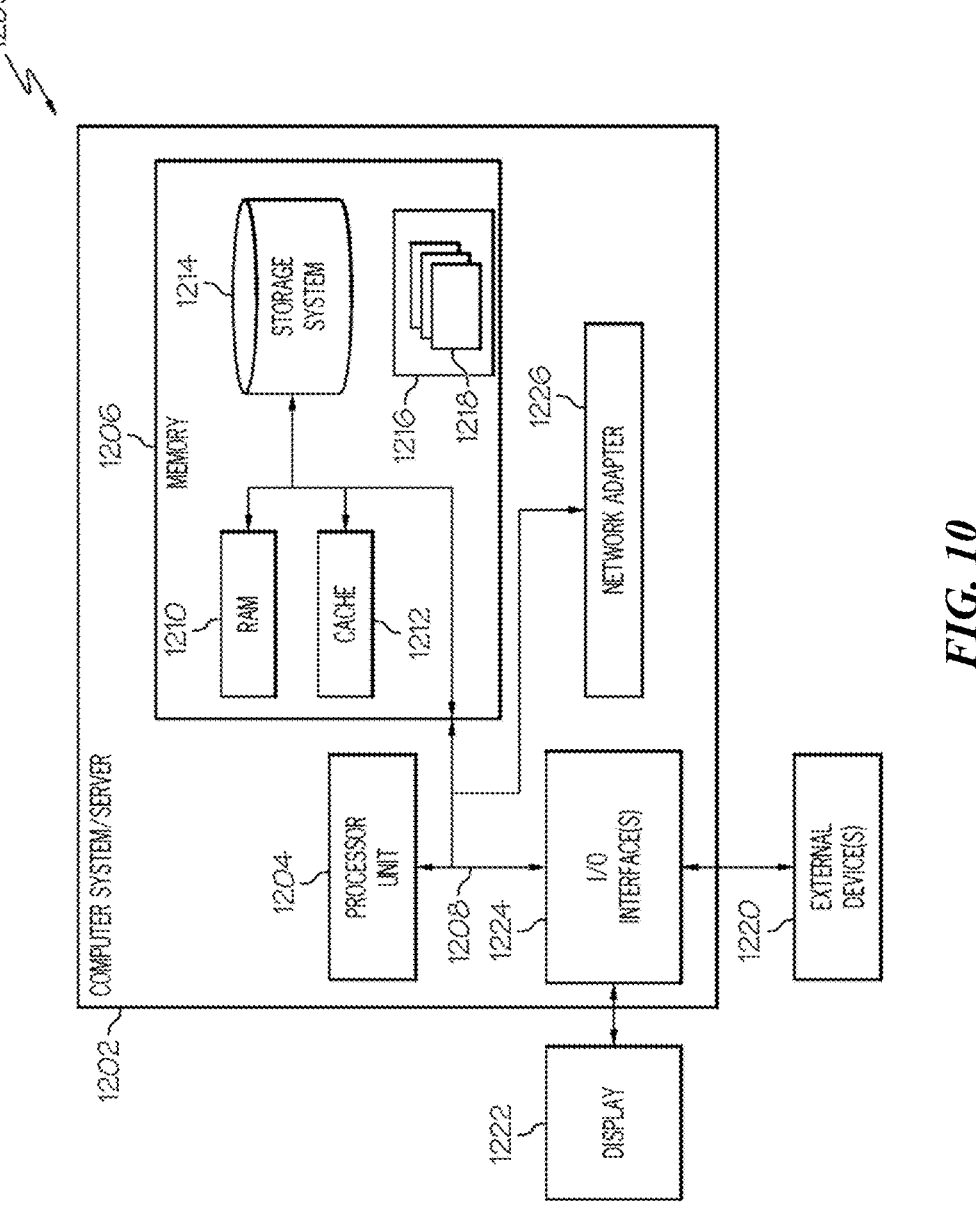

Example FIG. 10 illustrates a cloud computing node, in accordance with embodiments.

Figure 11:
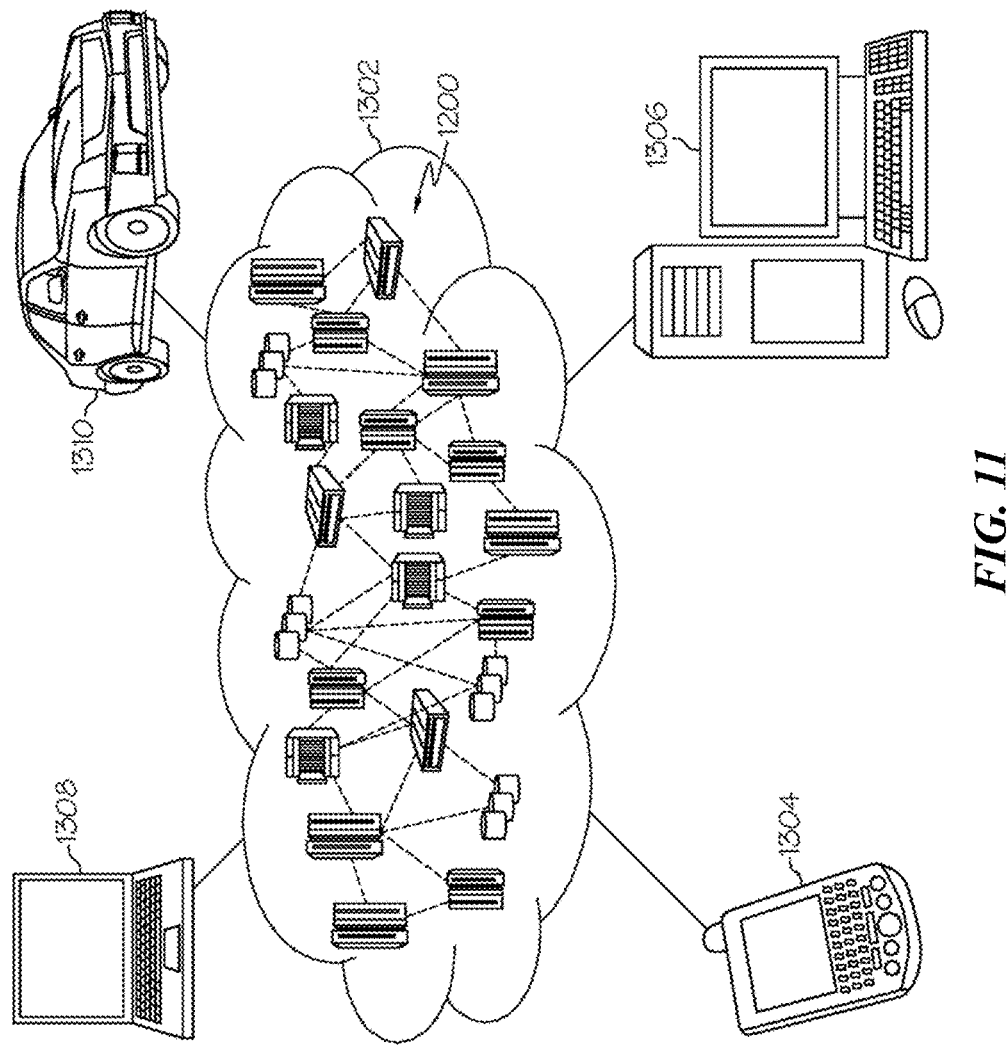

Example FIG. 11 illustrates a cloud computing environment, in accordance with embodiments.

Figure 12:
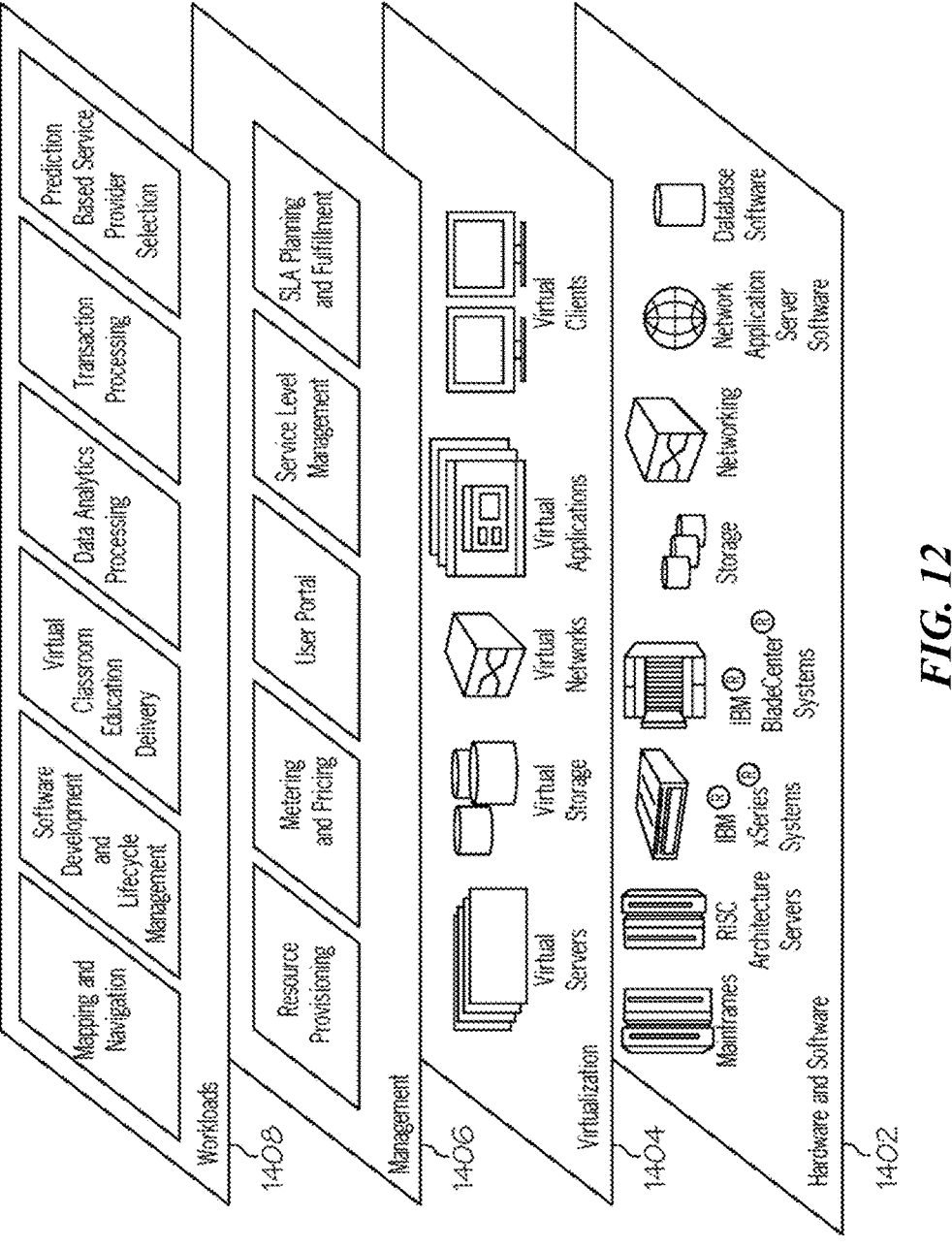

Example FIG. 12 illustrates abstraction model layers, in accordance with embodiments.

DESCRIPTION

Example FIG. 1 illustrates a magnetic pipe sensor 8, in accordance with embodiments. The magnetic pipe sensor 8 may be formed on a pipe 18 to be tested. Specifically, magnetic pipe sensor 8 may be permanently fixed to a representative section of a pipe 18 and use magnetic sensors to detect the extent of corrosion of the pipe over time by detecting changes in the magnetic field characteristics of the pipe 18.

Pipe 18 may be part of either an underwater pipeline or an above-water pipeline. The pipe 18 may be present in a harsh environment or transport corrosive materials, which may cause the pipe 18 to corrode over time. Although pipe 18 may be expected to corrode over the useful life of the pipe 18, at some point in time the accumulated corrosion will render the pipe 18 unusable and need to be replaced and/or demolished. It is desirable to extend the useful life of the pipe 18 for as long as possible to avoid or delay replacement costs. Replacement costs and/or demolition costs of a pipeline including pipe 18 may be significant. Magnetic pipe sensor 8 may be used to detect the extent of corrosion, so that the operator and/or owner of pipe 18 can make an optimal decision as to when to replace and/or demolish pipe 18, in accordance with embodiments. If a pipe 18 is not corroded enough to require replacement and/or demolition, then it is advantageous for the operator of pipe 18 to realize this circumstance using the magnetic pipe sensor 8, so that the useful life of the pipe 18 can be extended and unnecessary or premature replacement and/or demolition costs can be avoided. Likewise, if pipe 18 has corroded at a relatively faster rate and failure of pipe 18 is imminent, it is important for the operator of pipe 18 to realize this situation using magnetic pipe sensor 8, so that pipe 18 can be appropriately repaired, replaced, and/or demolished.

Examples of corrosive materials that may be transported by pipe 18 are petrochemical products, chlorine, ammonium, hydrogen, saltwater, biomass, smelting material, oil, gas, and/or any other material that may have a corrosive effect on pipe 18. The composition of materials being transported by pipe 18 may not be consistent and/or may not be predictable, so the corrosion of pipe 18 may likewise not be predictable. Depending on the application, pipe 18 may be present and operate in harsh environments that accelerate corrosion, such as on the floor of an ocean or other saltwater body of water. For example, saltwater external to pipe 18 may influence the corrosion of the pipe 18. As another example, if the pipe 18 located deep on the bottom of the ocean (e.g. 3,000 meters under water) under high pressure, the high pressure may also influence the corrosion of the pipe 18. One of ordinary skill in the art would appreciate other unpredictable circumstances that may affect the corrosion of pipe 18 either under water or above water.

In embodiments, magnetic pipe sensor 8 may be installed on pipe 18 at the time of installation. In embodiments, the length of the magnetic pipe sensor 8 may be approximately 50 cm, but any other practical length of the magnetic pipe sensor 8 may be used. In embodiments, the magnetic pipe sensors 8 may be dispersed along the distance of pipeline 18 at regular intervals, critical locations, and/or representative locations. For example, magnetic pipe sensors 8 may be positioned 1 kilometer from each other along a pipeline including pipe 18 or at any other practical distance. As another example, magnetic pipe sensors 8 may be positioned at locations that are more susceptible to corrosion, such as low points, high points, at bends, near material sources, and/or any other pipeline feature that could have an effect on corrosion.

In embodiments, magnetic pipe sensors 8 take periodic magnetic measurements and transmit the results of those measurements to a centralized data processing system or device for analysis. In embodiments, a centralized data processing system may be a cloud based system. The cloud based system may use artificial intelligences, machine learning, and/or any other analytical technique to determine the extent of corrosion in pipe 18. Magnetic pipe sensors 8 may take measurements at any practical iteration, which may be in units of seconds, minutes, hours, days, months, or years. For example, a magnetic pipe sensor 8 may measure the magnetic field response within pipe 18 on a weekly basis and report the measurements taken to the analysis system for processing. The analysis system may compare the measurement from previous measurements by the magnetic pipe sensor 8 and determine and/or estimate the extent of the corrosion in pipeline 18 based on the changes from the pervious measurements. The analysis system may compare the measurements taken to measurement taken by another magnetic pipe sensor 8 at a different location on the pipeline containing pipe 18 or from a different pipeline.

The magnetic pipe sensor 8 may include one or more sensor units. Each sensor unit may include an inner shell 22 and an outer shell 12. A magnetic sensor array 16 may be disposed between the inner shell 22 and the outer shell 12. In embodiments, either the inner shell 22 or the outer shell 12 may be made of stainless steel, aluminum, carbon fiber, industrial grade plastic, a hybrid material, and/or any other similar suitable material appreciated by those skilled in the art. In embodiments, the inner shell 22, the outer shell 12, and/or the magnetic sensor array 16 may have a curved shape that complements the surface of the pipe 18.

In embodiments, multiple sensor units may surround a portion of pipe 18 in a so called clamshell configuration. In some embodiments, three sensor units may surround a portion of pipe 18 in a clamshell configuration. The plurality of sensor units may be arranged contiguously around the pipe 18 such that the plurality of sensors fully surround the pipe 18. The plurality of sensor units may be arranged contiguously around the pipe 18 such that there are minimal blind zones between the magnetic sensor arrays 16 of each of the sensor units. In other embodiments, two sensor units may surround a portion of pipe 18 in a clamshell configuration. The number of sensor units used to surround a portion of pipe 18 may depend on the diameter of pipe 18. For example, a pipe 18 that has a diameter of 2 meters or more may have three or more sensor units, while a pipe 18 that has a diameter of 50 centimeters or less may have only two sensor units. A belt 20 may be used to secure the multiple sensor units to pipe 18. In embodiments, belt 20 may be a rubber material, another elastic material, a non-elastic material, and/or any other material that could be used to secure the multiple sensor units to pipe 18 in a long-term static manner. In embodiments, insulation 24 may be formed over the outer shell 12.

Example FIG. 2 illustrates a sensor unit 10 of a magnetic pipe sensor, in accordance with embodiments. Sensor unit 10 may include inner shell 36, outer shell 26, and magnetic sensor array 40. The magnetic sensor array 40 is disposed between the inner shell 36 and the outer shell 26. In embodiments, the inner shell 36 and/or the outer shell 26 may be made of aluminum, carbon fiber, industrial grade plastic, a hybrid material and/or a combination of materials appreciated by those skilled in the art. In embodiments, the inner shell 36 and/or the outer shell 26 may be made of any material as appreciated by those skilled in the art.

In embodiments, the magnetic sensor array 40 includes a plurality of printed circuit board strips 41. Each of the plurality of printed circuit board strips 41 includes a plurality of magnetic sensors distributed along each of the printed circuit board strips 41. For example, magnetic sensors may be distributed every 2 centimeters along each of the printed circuit board strips 41 or at any other distance appreciated by those skilled in the art. In some embodiments, magnetic sensors are distributed at a distance that is approximately twice the thickness of the pipe that is being monitored. The plurality of printed circuit boards strips 41 is arranged in parallel in a curved arrangement that complements the outer surface of the pipe, the inner shell, and the outer shell. In embodiments, the plurality of circuit board strips 41 is maintained in the curved arrangement by a plurality of printed circuit board holders 42.

In embodiments, at least one guide 29 for at least one belt is on the outer shell 26, with a belt cover 30 interfacing with the guide. The belt may be an elastic or non-elastic material that is configured to hold the plurality of sensor units securely and statically on a pipe for a long period of time. In embodiments, a rubber gripper 38 may be disposed between the inner shell 36 and the pipe to prevent the sensor unit 10 from slipping or otherwise changing position along the pipe over time, using the pressure from the belt to maintain pressure between the sensor unit 10 and the pipe.

In embodiments, the sensor unit 10 comprises a signal processing unit 34. The signal processing unit 34 is configured to manage communication between the magnetic sensor array and any analysis systems that are located external to the sensor unit 10, in accordance with embodiments. In embodiments, the signal processing unit 34 is configured to drive and/or control the magnetic sensor array 40.

In embodiments, the plurality of circuit board holders 42 include signal processing unit compatible printed circuit board holders 46. The signal processing unit compatible printed circuit board holders 46 may maintain the position of the signal processing unit 34 between the inner shell 36 and outer shell 26 in a position that prevents the signal processing unit 34 from interfering with the operation of the magnetic sensor array 40. Also, in embodiments, the signal processing unit compatible printed circuit board holders 46 may maintain the plurality of circuit board strips 41 in a curved arrangement that complements the outer surface of the pipe, the inner shell 36, and/or the outer shell 26.

In embodiments, at least one flex printed circuit board holder 44 is provided that maintains the position of the end portions of the plurality of circuit board strips 41 without interfering with the seal of the gasket 32.

In embodiments, a connector port 28 is disposed on the surface of the outer shell, which provide for electrical connections to the sensor unit 10. The electrical connections to the sensor unit 10 may include both electric power connections and/or communication connections.

The sensor unit 10 is connected to a power supply. In embodiments, the power supply is a battery based power supply. In embodiments, the power supply is a power supply network. In embodiments, the sensor unit 10 works together with one or more other sensor units 10 to surround a pipe. The other sensor units 10 are configured to provide redundancy as a power supply, in accordance with embodiments.

The sensor unit 10 is connected to a communication unit. In embodiments, the communication unit is a wired communication unit. In embodiments, the communication unit is a wireless communications unit. The other sensor units 10 are configured to provide redundancy to the communication unit, in accordance with embodiments.

Since the sensor unit 10 may be located in harsh environments, the sensor unit 10 may be sealed by gasket 32 (e.g. an o-ring). The gasket 32 may be disposed between the inner shell 36 and the outer shell 26. Likewise, the connector port 28, may be provided in a manner that allows for electrical connections between the sensor unit and the outside environment, while maintaining the inside of the sensor unit sealed.

Example FIGS. 3A and 3B illustrate views of the inner shell 36 of the sensor unit 10, in accordance with embodiments. Inner shell 36 may include support members 37 which support the positioning of the plurality of printed circuit board strips 41 in relation to the pipe.

Example FIGS. 4A and 4B illustrate the outer shell 26 of the sensor unit 10, in accordance with embodiments. Example FIGS. 5A and 5B illustrate belt covers 30 of the sensor unit 10, in accordance with embodiments. Example FIGS. 6A and 6B illustrate strips printed circuit board holders 40 of the sensor unit 10, in accordance with embodiments. Example FIGS. 7A and 7B illustrate signal processing unit compatible printed circuit board holders 46 of the sensor unit 10, in accordance with embodiments. Example FIGS. 8A and 8B illustrate flex printed circuit board holders 44 of the sensor unit 10, in accordance with embodiments.

Example FIG. 9 illustrates a cloud computing environment 48 and/or network based system in communication with magnetic pipe sensors, in accordance with embodiments. The cloud computing environment 48 may communicate with a plurality of sensor units 10 disposed on pipes 18 that are being evaluated for corrosion. The different sensor unit sets 10 may be on the same pipeline or different pipelines. The cloud computing environment 48 may provide analysis using artificial intelligence, machine learning, and/or any other analytic algorithm. In embodiments, instead of the cloud computing environment 48, any other analytical mechanism, network, and/or computing configuration may be used. For example, analysis may also be performed locally to the sensor units 10 in a hybrid configuration.

Example FIG. 10 illustrates a schematic of an example of a cloud computing node, in accordance with embodiments. Cloud computing node 1200 is only one example of a suitable cloud computing node and is not intended to suggest any limitation as to the scope of use or functionality of embodiments described herein. Regardless, cloud computing node 1200 is capable of being implemented and/or performing any of the functionality set forth hereinabove. The term processing node is a logical concept. Any number of central processing units with any number of cores or machines can be in a single processing node.

In cloud computing node 1200 there is a computer system/server 1202, which is operational with numerous other general purpose or special purpose computing system environments or configurations. Examples of well-known computing systems, environments, and/or configurations that may be suitable for use with computer system/server 1202 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 1202 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 1202 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 10, computer system/server 1202 in cloud computing node 1200 is shown in the form of a general-purpose computing device. The components of computer system/server 1202 may include, but are not limited to, one or more processors or processing units 1204, a system memory 1206, and a bus 1208 that couples various system components including system memory 1206 to processor 1204.

Bus 1208 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 1202 typically includes a variety of computer system readable media. Such media may be any available media that is accessible by computer system/server 1002, and it includes both volatile and non-volatile media, removable and non-removable media.

The system memory 1206 can include computer system readable media in the form of volatile memory, such as random access memory (RAM) 1210 and/or cache memory 1212. Computer system/server 1202 may further include other removable/non-removable, volatile/non-volatile computer system storage media. By way of example only, storage system 1214 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 1208 by one or more data media interfaces. As will be further depicted and described below, memory 1206 may include at least one program product having a set (e.g., at least one) of program modules that are configured to carry out the functions of various embodiments of the invention.

Program/utility 1216, having a set (at least one) of program modules 1218, may be stored in memory 1206 by way of example, and not limitation, as well as an operating system, one or more application programs, other program modules, and program data. Each of the operating system, one or more application programs, other program modules, and program data or some combination thereof, may include an implementation of a networking environment. Program modules 1218 generally carry out the functions and/or methodologies of various embodiments of the invention as described herein.

Computer system/server 1202 may also communicate with one or more external devices 1020 such as a keyboard, a pointing device, a display 1222, etc.; one or more devices that enable a user to interact with computer system/server 1202; and/or any devices (e.g., network card, modem, etc.) that enable computer system/server 1202 to communicate with one or more other computing devices. Such communication can occur via I/O interfaces 1224. Still yet, computer system/server 1202 can communicate with one or more networks such as a local area network (LAN), a general wide area network (WAN), and/or a public network (e.g., the Internet) via network adapter 1226. As depicted, network adapter 1226 communicates with the other components of computer system/server 1202 via bus 1208. It should be understood that although not shown, other hardware and/or software components could be used in conjunction with computer system/server 1202. Examples, include, but are not limited to: microcode, device drivers, redundant processing units, external disk drive arrays, RAID systems, tape drives, and data archival storage systems, etc.

Example FIG. 11 illustrates cloud computing environment 1302, in accordance with embodiments. As shown, cloud computing environment 1302 comprises one or more cloud computing nodes 1200 with which local computing devices used by cloud consumers, such as, for example, personal digital assistant (PDA) or cellular telephone 1304, desktop computer 1306, laptop computer 1308, and/or automobile computer system 1310 may communicate. Nodes 1200 may communicate with one another. They may be grouped (not shown) physically or virtually, in one or more networks, such as Private, Community, Public, or Hybrid clouds as described hereinabove, or a combination thereof. This allows cloud computing environment 1302 to offer infrastructure, platforms and/or software as services for which a cloud consumer does not need to maintain resources on a local computing device. It is understood that the types of computing devices 1304, 1306, 1308, 1310 shown in FIG. 11 are intended to be illustrative only and that computing nodes 1200 and cloud computing environment 1302 can communicate with any type of computerized device over any type of network and/or network addressable connection (e.g., using a web browser).

Example FIG. 12 illustrates a set of functional abstraction layers provided by cloud computing environment 1302 (FIG. 11), in accordance with embodiments. It should be understood in advance that the components, layers, and functions shown in FIG. 12 are intended to be illustrative only and embodiments are not limited thereto. As depicted, the following layers and corresponding functions are provided:

Hardware and software layer 1402 includes hardware and software components. Examples of hardware components include mainframes; RISC (Reduced Instruction Set Computer) architecture based servers; storage devices; networks and networking components. Examples of software components include network application server software and database software.

Virtualization layer 1404 provides an abstraction layer from which the following examples of virtual entities may be provided: virtual servers; virtual storage; virtual networks, including virtual private networks; virtual applications and operating systems; and virtual clients. In one example, management layer 1406 may provide the functions of processing unit 68. Workloads layer 1408 provides examples of functionality for which the cloud computing environment may be utilized.

Aspects of the present invention have been discussed above with reference to flowchart illustrations and/or block diagrams of methods, apparatus (systems) and computer program products according to various embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

It will be obvious and apparent to those skilled in the art that various modifications and variations can be made in the embodiments disclosed. Thus, it is intended that the disclosed embodiments cover the obvious and apparent modifications and variations, provided that they are within the scope of the appended claims and their equivalents.

Example implementations or implementations are described below. The following descriptions are not intended to limit the scope of this application.

Example 1. An apparatus comprising at least one sensor unit, wherein: each of the at least one sensor unit comprises an inner shell, an outer shell, and a magnetic sensor array; the magnetic sensor array is between the inner shell and the outer shell; the inner s hell, the outer shell, and the magnetic sensor array have curved shapes that complements an outer surface of a pipe; the magnetic sensor array comprises a plurality of printed circuit board strips; and each of the plurality of printed circuit board strips comprises a plurality of magnetic sensors distributed along each of the plurality of the printed circuit board strips.

Example 2. The apparatus of example 1, wherein the at least one sensor unit is configured to detect corrosion of the pipe over time.

Example 3. The apparatus of example 1 or 2, wherein: the at least one sensor unit is a plurality of sensor units; the plurality of sensor units are arranged contiguously around the pipe such that plurality of sensor units fully surround the pipe.

Example 4. The apparatus of example 3, wherein the plurality of sensor units are arranged contiguously around the pipe such that there are minimal blind zones between the magnetic sensor arrays of each of the plurality of sensor units.

Example 5. The apparatus of example 3 or 4, wherein the plurality of sensor units comprises two sensor units.

Example 6. The apparatus of example 3 or 4, wherein the plurality of sensor units comprises three sensor units.

Example 7. The apparatus of any one of examples 3 to 6, wherein the plurality of sensor units are maintained in contact with the pipe by at least one belt disposed a round the plurality of sensor units.

Example 8. The apparatus of example 7, wherein: each of the plurality of sensor units comprises at least one guide for the at least one belt on the outer shell; and each of the plurality of sensor units comprises at least one belt cover interfacing with the at least one guide.

Example 9. The apparatus of example 8, wherein a rubber gripper is disposed between the inner shell and the pipe.

Example 10. The apparatus of any one of examples 1 to 9, wherein the pipe is configured to transport at least one of: petrochemical products; chlorine; ammonium; hydrogen; saltwater; biomass; smelted material; oil; and gas.

Example 11. The apparatus of any one of examples 1 to 10, wherein the at least one sensor unit is disposed on the pipe under water.

Example 12. The apparatus of any one of examples 1 to 10, wherein the at least one sensor unit is disposed on the pipe above water.

Example 13. The apparatus of any one of examples 1 to 12, wherein at least one of the inner shell or the outer shell comprises at least one of aluminum, carbon fiber, industrial grade plastic, or hybrid materials.

Example 14. The apparatus of any one of examples 1 to 13, comprising a rubber gripper configured to be disposed between the inner shell and the pipe.

Example 15. The apparatus of any one of examples 1 to 14, wherein the plurality of printed circuit board strips are arranged in parallel in a curved arrangement that complements the outer surface of the pipe, the inner shell, and the outer shell.

Example 16. The apparatus of example 15, wherein the plurality of printed circuit board strips are maintained in the curved arrangement by a plurality of printed circuit board holders.

Example 17. The apparatus of any one of examples 1 to 16, wherein the at least one sensor unit comprises a signal processing unit, wherein the signal processing un it is configured to manage communication between the magnetic sensor array and a system located external to the at least one sensor unit.

Example 18. The apparatus of example 17, wherein: the plurality of printed circuit board strips are arranged in parallel in a curved arrangement that complements the outer surface of the pipe, the inner shell, and the outer shell; the plurality of printed circuit board strips are maintained in the curved arrangement by a plurality of printed circuit board holders; and the plurality of printed circuit board holders comprise at least one signal processing unit compatible printed circuit board holder configured to maintain the position of the signal processing unit.

Example 19. The apparatus of example 17 or 18, comprising a connect or port in the outer shell configured to provide a communication connection to the at least one sensor unit.

Example 20. The apparatus of any one of examples 1 to 19, comprising at least one gasket disposed at an interface of the inner shell and the outer shell that is configured to seal the at least one sensor unit.

Example 21. The apparatus of example 20, wherein: the plurality of printed circuit board strips are arranged in parallel in a curved arrangement that complements the outer surface of the pipe, the inner shell, and the outer shell; the plurality of printed circuit board strips are maintained in the curved arrangement by a plurality of printed circuit board holders; and the plurality of printed circuit board holders comprise at least one flex printed circuit board holder configured to maintain the position of an end portion of the plurality of printed circuit board strips without interfering with the seal of the at least one gasket.

Example 22. The apparatus of any one of examples 1 to 21, wherein: the at least one sensor unit is connected to a power supply; the power supply is at least one of a battery or power supply network; and the at least one sensor unit comprises a first sensor un it and a second sensor unit; and the second sensor unit is configured with redundancy to the first sensor unit as a power supply.

Example 23. The apparatus of any one of examples 1 to 22, wherein: the at least one sensor unit is connected to a communication unit; the communication unit is at least one of a wired communication unit or a wireless communication unit; the at least one sensor unit comprises a first sensor unit and a second sensor unit; and the second sensor unit is configured with redundancy to the first sensor unit to connect to the communication unit.

Example 24. The apparatus of any one of examples 1 to 23, wherein: the at least one sensor unit is connected to a communication unit; the communication unit is configured to transmit the sensor data received from the magnetic sensor array through a network to a cloud computing system.

Example 25. The apparatus of example 24, wherein the cloud computing system is configured to analyze the sensor data from the at least one sensor unit to determine an extent of corrosion in the pipe.

Example 26. The apparatus of example 25, wherein the cloud computing system is configured to analyze the sensor data from the at least one sensor unit to determine the extent of corrosion in the pipe using at least one of machine learning or artificial intelligence.

Example 27. The apparatus of any one of examples 24 to 26, wherein the at least one sensor unit is configured to receive instructions from the cloud computing system related to an operation of the at least one sensor unit.

What is claimed is:

1. An apparatus for monitoring corrosion in a pipe, the apparatus comprising:
   a plurality of sensor units configured to be arranged contiguously around the pipe such that plurality of sensor units are capable of fully surrounding the pipe;

each of the plurality of sensor units comprising:

an inner shell, an outer shell, and a magnetic sensor array;

the magnetic sensor array is between the inner shell and the outer shell;

the inner shell, the outer shell, and the magnetic sensor array have curved shapes that complements an outer surface of the pipe;

the magnetic sensor array comprises a plurality of printed circuit board strips; and each of the plurality of printed circuit board strips comprises a plurality of magnetic sensors distributed along each of the plurality of the printed circuit board strips, wherein:

the plurality of sensor units are maintained in contact with the pipe by at least one belt disposed around the plurality of sensor units to maintain the plurality of sensor units in a clamshell configuration around the pipe, each of the plurality of sensor units comprises at least one guide for the at least one belt on the outer shell; and each of the plurality of sensor units comprises at least one belt cover interfacing with the at least one guide.

2. The apparatus of claim 1, wherein the plurality of sensor units are configured to detect corrosion of the pipe over time.

3. The apparatus of claim 1, wherein the plurality of sensor units are arranged contiguously around the pipe such that there are minimal blind zones between the magnetic sensor arrays of each of the plurality of sensor units.

4. The apparatus of claim 1, wherein the plurality of sensor units comprises two or three sensor units.

5. The apparatus of claim 1, wherein a rubber gripper is disposed between the inner shell and the pipe.

6. The apparatus of claim 1, wherein at least one of the inner shell or the outer shell comprises at least one of aluminum, carbon fiber, industrial grade plastic, or hybrid materials.

7. The apparatus of claim 1, wherein the plurality of printed circuit board strips are arranged in parallel in a curved arrangement that complements the outer surface of the pipe, the inner shell, and the outer shell.

8. The apparatus of claim 7, wherein the plurality of printed circuit board strips are maintained in the curved arrangement by a plurality of printed circuit board holders.

9. The apparatus of claim 1, wherein each of the plurality of sensor units comprises a signal processing unit, wherein the signal processing unit is configured to manage communication between the magnetic sensor array and a system located external to the at least one sensor unit.

10. The apparatus of claim 9, wherein:

the plurality of printed circuit board strips are arranged in parallel in a curved arrangement that complements the outer surface of the pipe, the inner shell, and the outer shell;

the plurality of printed circuit board strips are maintained in the curved arrangement by a plurality of printed circuit board holders; and the plurality of printed circuit board holders comprise at least one signal processing unit compatible printed circuit board holder configured to maintain the position of the signal processing unit.

11. The apparatus of claim 9, comprising a connector port in the outer shell configured to provide a communication connection to the at least one sensor unit.

12. The apparatus of claim 1, wherein each of the plurality of sensor units comprises at least one gasket disposed at an interface of the inner shell and the outer shell that is configured to seal the at least one sensor unit.

13. The apparatus of claim 12, wherein:

the plurality of printed circuit board strips are arranged in parallel in a curved arrangement that complements the outer surface of the pipe, the inner shell, and the outer shell;

the plurality of printed circuit board strips are maintained in the curved arrangement by a plurality of printed circuit board holders; and the plurality of printed circuit board holders comprise at least one flex printed circuit board holder configured to maintain the position of an end portion of the plurality of printed circuit board strips without interfering with the seal of the at least one gasket.

14. The apparatus of claim 1, wherein:

each of the plurality of sensor units is connected to a power supply;

the power supply is at least one of a battery or power supply network; and the plurality of sensor units comprises a first sensor unit and a second sensor unit; and the second sensor unit is configured with redundancy to the first sensor unit as a power supply.

15. The apparatus of claim 1, wherein:

each of the plurality of sensor units is connected to a communication unit;

the communication unit is at least one of a wired communication unit or a wireless communication unit;

the plurality of sensor units comprises a first sensor unit and a second sensor unit; and the second sensor unit is configured with redundancy to the first sensor unit to connect to the communication unit.

16. The apparatus of claim 1, wherein:

each of the plurality of sensor units is connected to a communication unit;

the communication unit is configured to transmit sensor data received from the magnetic sensor array through a network to a cloud computing system.

17. The apparatus of claim 16, wherein each of the plurality of sensor units is configured to receive instructions from the cloud computing system related to an operation of each of the plurality of sensor units.

18. The apparatus of claim 1, wherein the inner shell includes support members that support the positioning of the plurality of printed circuit board strips in relation to the pipe.

19. The apparatus of claim 1, wherein the pipe has a thickness and wherein the plurality of magnetic sensors distributed along each of the printed circuit board strips such that the magnetic sensors are distributed at a distance that is approximately twice the thickness of the pipe that is being monitored.

* * * * *